United States Patent [19]
Doi et al.

[11] 3,951,524
[45] Apr. 20, 1976

[54] PROJECTION LENS SYSTEM FOR MOTION PICTURE PROJECTOR

[75] Inventors: Yoshikazu Doi, Omiya; Nagayoshi Hirano, Urawa, both of Japan

[73] Assignee: Fuji Photo Optical Co., Ltd., Omiya, Japan

[22] Filed: Jan. 29, 1975

[21] Appl. No.: 545,196

[30] Foreign Application Priority Data
Feb. 8, 1974   Japan.............................. 49-16023

[52] U.S. Cl. .......................... 350/216; 350/175 FS
[51] Int. Cl.² .......................................... G02B 9/60
[58] Field of Search ............... 350/216, 220, 175 FS

[56] References Cited
UNITED STATES PATENTS
2,989,895   6/1961   Sandback....................... 350/216 X
3,466,115   9/1969   Ruben............................... 350/220

*Primary Examiner*—Paul A. Sacher

[57] ABSTRACT

A projection lens system comprises a positive meniscus lens G1 (as numbered consecutively from front to rear) convex to the front, a biconcave lens G2, a biconvex lens G3, a positive meniscus lens G4 convex to the front, and a biconcave lens G5. The projection lens system is designed to be well matched with the halogen lamp of cold mirror type in which the distance to the secondary focus is short by using a negative lens at the rear end thereof, making the Petzval sum small, locating the entrance pupil as near to the aperture as possible and shortening the back focal distance. The image surface is made flat and spherical aberration and astigmatism are well corrected. The high order comatic flares are markedly reduced and an image of high sharpness and contrast can be obtained thereby. Further, the radii of curvature of all the surfaces in the lens system are made not smaller than 0.68f so that the lenses can be manufactured at a low cost.

5 Claims, 6 Drawing Figures

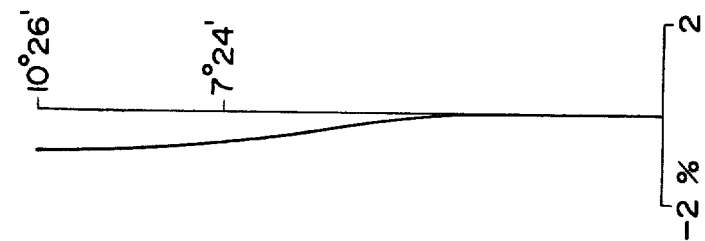
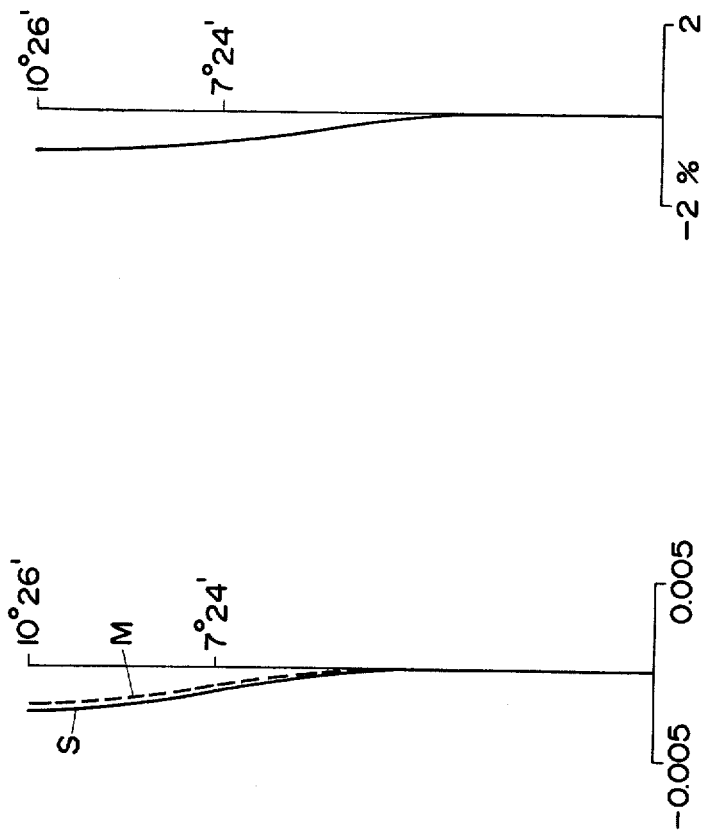
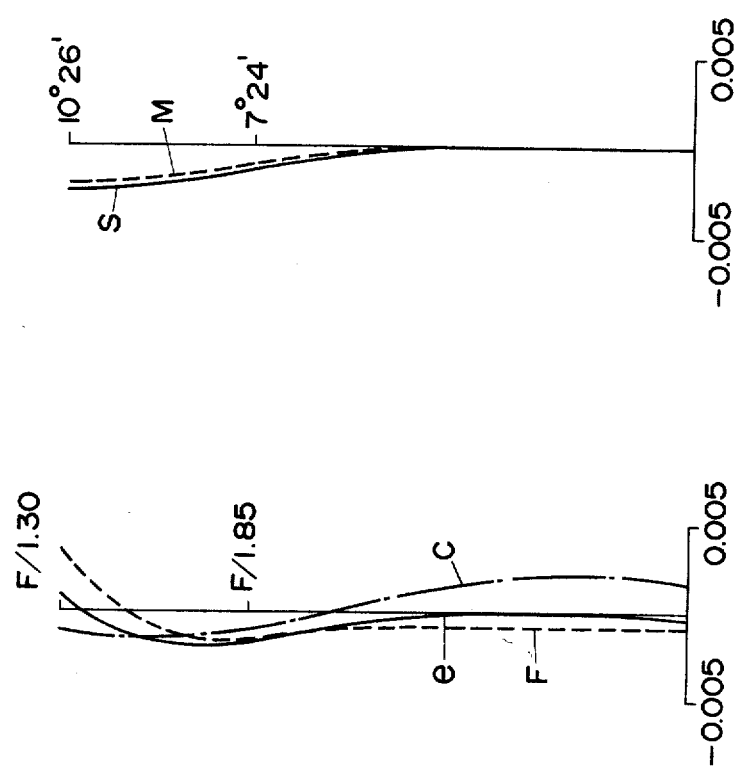

PROJECTION LENS SYSTEM FOR MOTION PICTURE PROJECTOR

BACKGROUND OF THE INVENTION

1. Field of the Invention

This invention relates to a projection lens system, and more specifically to a projection lens system which is particularly suitable for a motion picture projector. The angle of view of the lens system is 21° and the F-number thereof is F:1.3.

2. Description of the Prior Art

In a motion picture projector, it is desirable to use a projection lens which has a comparatively large angle of view and high resolving power. In accordance with the development of the motion picture film of 8mm, the effective area of one frame of the film has been increased by as much as 50 percent of the conventional one. In order to make good use of the improved 8 mm film, it is often desired to improve the projection lens. Particularly, are desired projection lenses which have high resolving power and a wide angle of field.

More concretely, the projection lens system to be employed in the 8mm motion picture projector is desired to satisfy the following conditions.

First, the brightness of the lens system is desired to be as high as F:1.0 to 1.3 in F-number in order to enhance the efficiency of the light source which may be a halogen lamp or the like. Second, the angle of view is desired to be not less than 20° so that a large image may be obtained in a small projection room. Third, the lens system is desired to be free from off-axis comatic flares and have good flatness of image surface in order to obtain a sharp image of high contrast wherein the marginal portion of the image is sharp even when the aperture is fully opened. Fourth, the chromatic aberration should be as small as possible. Fifth, the aperture efficiency is preferred to be large enough to illuminate the projected plane. Sixth, the lens should preferably be easily manufactured at a low cost.

As the conventional projection lens system there has been well known and widely used an Ernostar type lens system consisting of four lens components constituted of four lenses. This type of the conventional projection lens is characterized in that the brightness can be made as high as F:1.3 to 1.4 in F-number, although the angle of view is not so large. However, in general in this type of lens, it is difficult to make the Petzval sum not more than 0.5, and the flatness of the image surface is markedly degraded when the angle of view is made as large as 20°. Further, the spherical aberration will increase if the brightness is made as high as F:1.3. Therefore, the quality of the image obtained by this type of lens is unsatisfactory when it is employed in a middle or high class projector using a halogen lamp.

As the conventional projection lens system of high performance there has been known and used a so-called Hi-Fi lens. As a Hi-Fi lens of the brightness of F:1.3 to 1.4 there is known a Gauss type lens system consisting of four lens components constituted of six lenses. This type of lens is characterized in that the spherical aberration is well corrected when the brightness if F:1.3 to 1.4, and in the range of the angle of view of about 20° the off-axis comatic flares are well reduced and the Petzval sum is controlled to be 0.2 to 0.3 and the astigmatism can easily be corrected. However, this type of lens is difficult to manufacture since the radius of curvature of the third and sixth surfaces must be made about 0.4f and the radius of curvature of the fifth surface must be made about 0.3f (f is the effective focal length of the lens system) in order to make good correction for aberrations possible. Further, since the second and third lens components must be cemented lens components, the cost of manufacture becomes inevitably high.

SUMMARY OF THE INVENTION

In view of the above described difficulties inherent in the conventional lens systems, the object of the present invention is to provide a projection lens system which has high image forming performance wherein the aberration is well corrrected.

Another object of the present invention is to provide a projection lens system consisting of five lens components constituted of five lenses which can easily be manufactured at a low cost.

Still another object of the present invention is to provide a projection lens system which has a large F-number, a large angle of view, few off-axis comatic flares and a flat image surface.

A further object of the present invention is to provide a projection lens system by which a sharp image of high contrast can be obtained.

As well known in the art, the performance of the projection lens system is considerably influenced by the characteristics of the projection lamp. Therefore, the projection lamp must be carefully selected to be well matched with the projection lens so that it can exhibit its potential to the fullest possible. (It is desirable for the image of the filament of the projection lamp to be located at the entrance pupil of the lens system). However, it is almost impossible to freely select the lamp since most of the lamps are standardized and there are severe mechanical restrictions due to the structure of the projector. Accordingly, the projection lenses must be designed in consideration of the standardized projection lamps.

The projection lens system in accordance with the present invention is designed to be well matched with the halogen lamp of cold mirror type in which the distance to the secondary focus (filament image) is made short by using a negative lens at the rear end thereof, making the Petzval sum small, locating the entrance pupil as near to the aperture as possible and shortening the back focal distance about 0.29f.

The projection lens system in accordance with the present invention has a wide angle of view as large as 21° and a large F-number of F:1.3. The image surface is made with high flatness and spherical aberration and astigmatism are well corrected. The high order comatic flares are markedly reduced and an image of high sharpness and contrast can be obtained thereby. Further, since the radii of curvature of all the surfaces in the lens system are made not smaller than 0.68f, the lenses constituting the lens system of this invention can be manufactured at a low cost.

The projection lens system in accordance with the present invention consists of five lens components constituted of five lenses. The conditions to be satisfied by the lens system of this invention will be described in detail hereinafter in the detailed description of the invention.

BRIEF DESCRIPTION OF THE DRAWING

FIG. 2A depicts a graph representing the correction for spherical aberration of the lens system shown in FIG. 1, FIG. 2B depicts a graph representing the corrrection for astigmatism of the lens shown in FIG. 1, FIG. 2C depicts a graph representing the correction for distortion of the lens system shown in FIG. 1, and FIGS. 3A and 3B depict graphs representing the corrections for comatic aberration on the meridional image surface.

PREFERRED EMBODIMENT OF THE INVENTION

Figure 1:
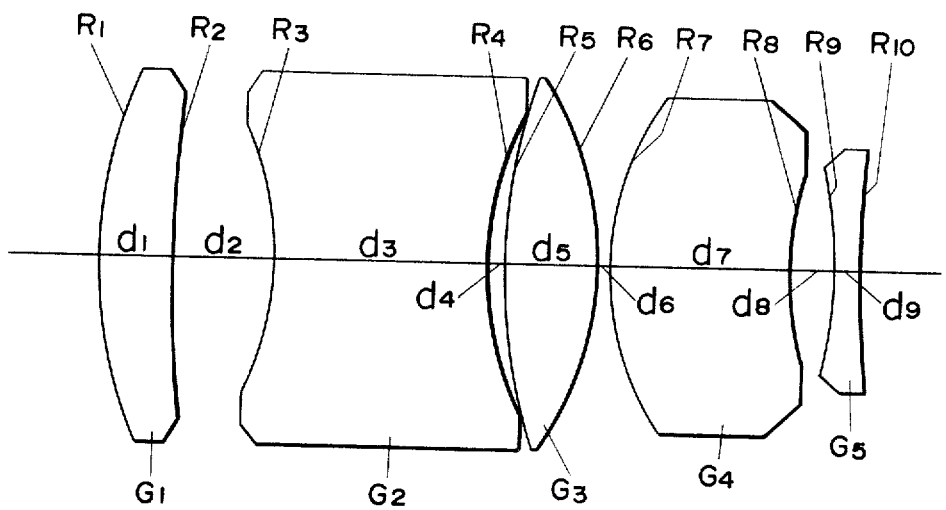
FIG. 1 is a longitudinal illustration of the lens system in accordance with an embodiment of the present invention.

The projection lens system in accordance with the present invention will be hereinbelow described in detail. It should be made clear that the terms "front" and "rear" are herein used in accordance with the usual convention to relate to the sides of the objective respectively nearer to and further from the longer conjugate.

The lens system in accordance with the present invention comprises a positive meniscus lens G1 (as numbered consecutively from front to rear) convex to the front, a biconcave lens G2, a biconvex lens G3, a positive meniscus lens G4 convex to the front, and a biconcave lens G5, and satisfied the following conditions;

1) $N1, N3, N4 > 1.69$ $1.68 < N2, N5 < 1.77$

2) $0.85f < d3+d7 < 1.0f$

3) $0.18/f < 1/R4 - 1/R5 < 0.22/f$ wherein $f$ represents the effective focal length of the lens system, $R$ represents the radii of curvature of the surfaces of the lenses, $d$ represents the axial air separations or thicknesses of the lenses and N represents the refractive indices for the helium d-line of the lenses being numbered, respectively, by subscripts in order from front to rear.

The meaning of the above described conditions will be hereinbelow explained.

1) $N1, N3, N4 < 1.69$ and $1.68 < N2, N5 < 1.77$

These first conditions are to be satisfied by the refractive indices of the material used for the first, third and fourth lenses G1, G3 and G4 in order to reduce the high order comatic flares and make the Petzval sum about 0.25. It will be apparent from a comparison of The Ernostar type image surface and the Gauss type image surface that the Petzval sum should be made not more than 0.3 in order to obtain a flat image surface.

2) $0.85f < d3+d7 < 1.0f$

These second conditions are to be satisfied by the sum of the thickness of the second lens and the air separation between the second and third lenses in order to keep the total length of the lens system and the aperture efficiency within a practical range while maintaining the Petzval sum in the desirable range. When the sum becomes equal to or less than the lower limit 0.85f, astigmatism increases. If correction of astigmatism by other parameters is attempted, comatic flares appear and the contrast of the image is lowered. When the sum becomes equal to or more than the upper limit of 1.0f, the total length of the lens system becomes impractically long and the aperture efficiency is lowered whereas astigmatism is reduced and the image surface flatness is improved.

3) $0.18/f < 1/R4 - 1/R5 < 0.22/f$

These third conditions are to be satisfied by the radii of curvature of the rear surface of the second lens G2 and the front surface of the third lens G3 in order to effect corrections for spherical aberration and the off-axis comatic flares. When the value defined becomes equal to or less than the lower limit 0.18f, spherical abberation is hardly corrected. When the value becomes equal to or more than the higher limit 1.0f, spherical aberration is corrected too much and the off-axis comatic flares appear.

Further, the above three conditions are effective for making the radius of curvature of the lens elements large, i.e. 0.68f at least. This will double the number of lens blanks which can be polished at once, which reduce the manufacturing cost of the lenses.

Five preferred embodiments I to V of the projection lens system in accordance with the present invention are constructed in conformity with the following Tables I to V, wherein dimensions are in terms of millimeters. The radii of curvature of the refracting surfaces, the axial air separations or thicknesses of lenses, the refractive indices for the helium $d$-line and the Abbe's dispersion numbers are respectively designated at R, $d$, N and $\nu$ which are numbered, respectively, by subscripts in order from front to rear.

Table I (Embodiment I)
$f=1.0$   $F:1.3$   $2\omega=21°$

| R1 = 0.909 | d1=0.15737 | Nd1=1.74400 | νd1=44.9 |
|---|---|---|---|
| R2 = 6.4579 | d2=0.21474 | | |
| R3 = 0.89815 | d3=0.48 | Nd2=1.76182 | νd2=26.5 |
| R4 = 1.00826 | d4=0.01579 | | |
| R5 = 1.26821 | d5=0.20316 | Nd3=1.74400 | νd3=44.9 |
| R6 = −0.816 | d6=0.01158 | | |
| R7 = 0.682631 | d7=0.4137 | Nd4=1.69680 | νd4=55.6 |
| R8 = 1.56642 | d8=0.07263 | | |
| R9 = −1.55716 | d9=0.05947 | Nd5=1.68893 | νd5=31.1 |
| R10= 2.27018 | | | |

Table II (Embodiment II)
$f=1.0$   $F:1.3$   $2\omega=21°$

| R1 = 0.923370 | d1=0.1542 | Nd1=1.74400 | νd1=44.9 |
|---|---|---|---|
| R2 = 8.12744 | d2=0.2168 | | |
| R3 = 0.89815 | d3=0.48 | Nd2=1.76182 | νd2=26.5 |
| R4 = 1.00826 | d4=0.01579 | | |
| R5 = 1.26821 | d5=0.20316 | Nd3=1.74400 | νd3=44.9 |
| R6 = −0.816 | d6=0.01158 | | |
| R7 = 0.682631 | d7=0.40842 | Nd4=1.69680 | νd4=55.6 |
| R8 = 1.56179 | d8=0.07526 | | |
| R9 = −1.58529 | d9=0.05579 | Nd5=1.68893 | νd5=31.1 |

Table II-continued

(Embodiment II)
f=1.0  F:1.3  2ω=21°

R10= 2.14157

Table III

(Embodiment III)
f=1.0  F:1.3  2ω=21°

| | | | |
|---|---|---|---|
| R1 = 0.907425 | d̄1=0.1579 | Nd1=1.74400 | νd1=44.9 |
| R2 = 5.84795 | d̄2=0.2274 | | |
| R3 = 0.898150 | d̄3=0.48 | Nd2=1.76182 | νd2=26.5 |
| R4 = 1.00826 | d̄4=0.01579 | | |
| R5 = 1.26821 | d̄5=0.20316 | Nd3=1.74400 | νd3=44.9 |
| R6 =−0.816 | d̄6=0.01158 | | |
| R7 = 0.681756 | d̄7=0.42 | Nd4=1.69680 | νd4=55.6 |
| R8 = 1.59490 | d̄8=0.06632 | | |
| R9 =−1.50805 | d̄9=0.06316 | Nd5=1.68893 | νd5=31.1 |
| R10= 2.57565 | | | |

Table IV

(Embodiment IV)
f=1.0  F:1.3  2ω=21°

| | | | |
|---|---|---|---|
| R1 = 0.904846 | d̄1=0.157 | Nd1=1.74400 | νd1=44.9 |
| R2 = 7.32215 | d̄2=0.21447 | | |
| R3 = 0.905002 | d̄3=0.4794 | Nd2=1.76182 | νd2=26.5 |
| R4 = 0.98981 | d̄4=0.0157 | | |
| R5 = 1.22224 | d̄5=0.203 | Nd3=1.74400 | νd3=44.9 |
| R6 =−0.817508 | d̄6=0.0117 | | |
| R7 = 0.682305 | d̄7=0.3945 | Nd4=1.69680 | νd4=55.6 |
| R8 = 1.56265 | d̄8=0.0782 | | |

Table IV-continued

(Embodiment IV)
f=1.0  F:1.3  2ω=21°

| | | | |
|---|---|---|---|
| R9 =−1.71871 | d̄9=0.0636 | Nd5=1.74077 | νd5=27.7 |
| R10= 2.33964 | | | |

Table V

(Embodiment V)
f=1.0  F:1.3  2ω=21°

| | | | |
|---|---|---|---|
| R1 = 0.967539 | d̄1=0.157 | Nd1=1.74400 | νd1=44.9 |
| R2 =14.9841 | d̄2=0.21886 | | |
| R3 =−0.917019 | d̄3=0.52149 | Nd2=1.76182 | νd2=26.5 |
| R4 = 1.00392 | d̄4=0.0157 | | |
| R5 = 1.26136 | d̄5=0.203 | Nd3=1.74400 | νd3=44.9 |
| R6 =−0.842659 | d̄6=0.01174 | | |
| R7 = 0.697871 | d̄7=0.4432 | Nd4=1.69680 | νd4=55.6 |
| R8 = 1.38587 | d̄8=0.1 | | |
| R9 =−1.77176 | d̄9=0.0636 | Nd5=1.74077 | νd5=27.7 |
| R10= 2.39221 | | | |

The Seidel sums and Petzval sums of the lens system in accordance with the first embodiment as specified in Table I are shown in Table VI and those of the conventional Gauss type lens system consisting of four lens components constituted of six lenses and the conventional Ernostar type lens system consisting of four lens components constituted of four lenses are shown, respectively, in Tables VII and VIII for comparison with the present invention, wherein Seidel sums for spherical aberration, comatic aberration, astigmatism and distortion are respectively designated at I, II, III and V, and Petzval sums are designated at P.

Table VI (Seidel sums of Embodiment I)
f'=1.0  F:1.3

| | I | II | III | P | V |
|---|---|---|---|---|---|
| 1 | 0.024105 | −0.001144 | 0.000367 | 0.235361 | −0.011188 |
| 2 | 0.010005 | 0.026532 | 0.475656 | −0.033129 | 1.17349 |
| 3 | −0.098956 | −0.127252 | −1.10629 | −0.241927 | −1.73372 |
| 4 | −0.049105 | 0.050892 | −0.356581 | −0.215506 | 0.592910 |
| 5 | 0.035883 | −0.042581 | 0.341611 | 0.168697 | −0.605568 |
| 6 | 0.095331 | 0.056338 | 0.225087 | 0.262185 | 0.287965 |
| 7 | −0.001936 | 0.005681 | −0.112705 | 0.301542 | −0.554126 |
| 8 | 0.021656 | 0.031620 | 0.312132 | −0.131409 | 0.263877 |
| 9 | −0.043902 | −0.024952 | −0.095878 | −0.131563 | −0.129264 |
| 10 | 0.010173 | 0.020794 | 0.287362 | −0.090241 | 0.402938 |
| SUM | 0.003253 | −0.004071 | −0.029230 | 0.124010 | −0.312683 |

Table VII (Seidel sums of Gauss type lens)
f'=1.0  F:1.4

| | I | II | III | P | V |
|---|---|---|---|---|---|
| 1 | 0.032696 | −0.029017 | 0.201946 | 0.273689 | −0.422120 |
| 2 | 0.003073 | 0.008502 | 0.184418 | −0.078044 | 0.294256 |
| 3 | 0.018922 | −0.015971 | 0.105710 | 0.527694 | −0.534619 |
| 4 | −0.000737 | −0.000833 | −0.007376 | 0.005202 | −0.002455 |
| 5 | −0.052943 | 0.056861 | −0.478888 | −0.796867 | 1.37017 |
| 6 | −0.067591 | 0.006812 | −0.005384 | −0.485658 | 0.049489 |
| 7 | 0.001822 | −0.004383 | 0.082681 | 0.012449 | −0.228857 |
| 8 | 0.043723 | −0.020844 | 0.077925 | 0.378033 | −0.217370 |
| 9 | −0.000150 | 0.001788 | −0.167507 | 0.219943 | −0.626606 |
| 10 | 0.027159 | −0.009747 | 0.027431 | 0.083441 | −0.039791 |

Table VII-continued

| | (Seidel sums of Gauss type lens) $f'=1.0$ F:1.4 | | | | |
|---|---|---|---|---|---|
| | I | II | III | P | V |
| SUM | 0.005975 | −0.006833 | 0.020956 | 0.139883 | −0.357904 |

Table VIII

| | (Seidel sums of Ernostar type lens) $f'=1.0$ F:1.3 | | | | |
|---|---|---|---|---|---|
| | I | II | III | P | V |
| 1 | 0.016960 | −0.005595 | 0.012475 | 0.191346 | −0.067241 |
| 2 | 0.001611 | 0.006734 | 0.190170 | −0.046476 | 0.0600476 |
| 3 | 0.008304 | −0.002352 | 0.004503 | 0.331019 | −0.095038 |
| 4 | 0.002592 | 0.003217 | 0.026991 | 0.0 | 0.033502 |
| 5 | −0.155805 | −0.179072 | −1.39095 | −0.053314 | −1.64995 |
| 6 | −0.00598 | 0.010293 | −0.119736 | −0.595049 | 1.23035 |
| 7 | −0.000202 | 0.001755 | −0.103263 | 0.292877 | −1.65113 |
| 8 | 0.029086 | 0.022349 | 0.125587 | 0.124435 | 0.199843 |
| SUM | −0.103432 | −0.141772 | −1.25423 | 0.244836 | −1.40920 |

Figure 3A:
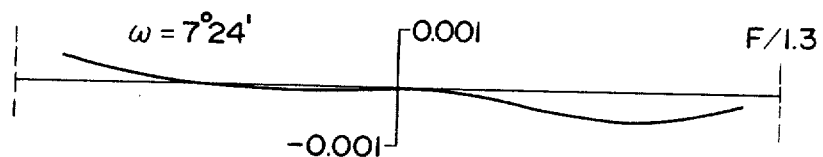
Figure 3B:
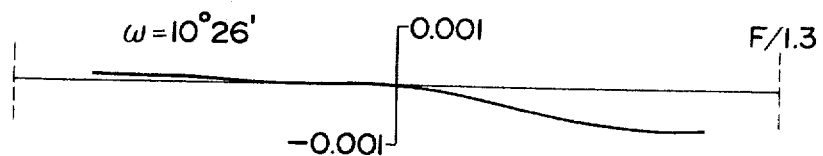

The aberration corrected by the lens system in accordance with the above specified lens system of the present invention are graphically shown in FIGS. 2A, 2B, 2C, 3A and 3B. FIG. 2A shows the correction for spherical aberration. FIG. 2B shows the correction for astigmatism wherein the astigmatism on the sagittal image surface is shown by the solid line and that on the meridional image surface is shown by the broken line. FIG. 2C shows the correction for distortion. FIGS. 3A and 3B show the correction for comatic aberration.

We claim:

1. A projection lens system comprising a positive meniscus lens G1 (as numbered consecutively from front to rear) convex to the front, a biconcave lens G2, a biconvex lens G3, a positive meniscus lens G4 convex to the front, and a biconcave lens G5, said lens system being designed in accordance with the following data, wherein R1, R2, ... R10 represent the radii of curvature of the surfaces of the lenses, $\overline{d1}, \overline{d2}, \ldots \overline{d9}$ represent the axial air separations or thicknesses of the lenses, $Nd1, Nd2, \ldots Nd5$ represent the refractive indices for the helium $d$-line and $vd1, vd2, \ldots vd5$ represent the Abbe's dispersion numbers;

Focal length : f=1.0
Relative aperture : F:1.3
Angle of field : 2ω=21°

| R1 = 0.909 | $\overline{d1}$=0.15737 | Nd1=1.74400 | νd1=44.9 |
|---|---|---|---|
| R2 = 6.4579 | $\overline{d2}$=0.21474 | | |
| R3 = 0.89815 | $\overline{d3}$=0.48 | Nd2=1.76182 | νd2=26.5 |
| R4 = 1.00826 | $\overline{d4}$=0.01579 | | |
| R5 = 1.26821 | $\overline{d5}$=0.20316 | Nd3=1.74400 | νd3=44.9 |
| R6 = −0.816 | $\overline{d6}$=0.01158 | | |
| R7 = 0.682631 | $\overline{d7}$=0.4137 | Nd4=1.69680 | νd4=55.6 |
| R8 = 1.56642 | $\overline{d8}$=0.07263 | | |
| R9 = −1.55716 | $\overline{d9}$=0.05947 | Nd5=1.68893 | νd5=31.1 |
| R10 = 2.27018. | | | |

2. A projection lens system comprising a positive meniscus lens G1 (as numbered consecutively from front to rear) convex to the front, a biconcave lens G2, a biconvex lens G3, a positive meniscus lens G4 convex to the front, and a biconcave lens G5, said lens system being designed in accordance with the following data, wherein R1, R2, ... R10 represent the radii of curvature of the surfaces of the lenses, $\overline{d1}, \overline{d2}, \ldots \overline{d9}$ represent the axial air separations or thicknesses of the lenses, $Nd1, Nd2, \ldots Nd5$ represent the refractive indices for the helium d-line and $vd1, vd2, \ldots vd5$ represent the Abbe's dispersion numbers;

Focal length : f=1.0
Relative aperature : F:1.3
Angle of field : 2ω=21°

| R1 = 0.923370 | $\overline{d1}$=0.1542 | Nd1=1.74400 | νd1=44.9 |
|---|---|---|---|
| R2 = 8.12744 | $\overline{d2}$=0.2168 | | |
| R3 = 0.89815 | $\overline{d3}$=0.48 | Nd2=1.76182 | νd2=26.5 |
| R4 = 1.00826 | $\overline{d4}$=0.01579 | | |
| R5 = 1.26821 | $\overline{d5}$=0.20316 | Nd3=1.74400 | νd3=44.9 |
| R6 = −0.816 | $\overline{d6}$=0.01158 | | |
| R7 = 0.682631 | $\overline{d7}$=0.40842 | Nd4=1.69680 | νd4=55.6 |
| R8 = 1.56179 | $\overline{d8}$=0.07526 | | |
| R9 = −1.58529 | $\overline{d9}$=0.05579 | Nd5=1.68893 | νd5=31.1 |
| R10 = 2.14157. | | | |

3. A projection lens system comprising a positive meniscus lens G1 (as numbered consecutively from front to rear) convex to the front, a biconcave lens G2, a biconvex lens G3, a positive meniscus lens G4 convex to the front, and a biconcave lens G5, said lens system being designed in accordance with the following data, wherein R1, R2, ... R10 represent the radii of curvature of the surfaces of the lenses $\overline{d1}, \overline{d2}, \ldots \overline{d9}$ represent the axial air separations or thicknesses of the lenses, $Nd1, Nd2 \ldots Nd5$ represent the refractive indices for the helium d-line and $vd1, vd2, \ldots vd5$ represent the Abbe's dispersion numbers;

Focal length : f=1.0
Relative aperture : F:1.3
Angle of field : 2ω=21°

| R1 = 0.907425 | $\overline{d1}$=0.1579 | Nd1=1.74400 | νd1=44.9 |
|---|---|---|---|
| R2 = 5.84795 | $\overline{d2}$=0.2274 | | |
| R3 = 0.898150 | $\overline{d3}$=0.48 | Nd2=1.76182 | νd2=26.5 |
| R4 = 1.00826 | | | |

-continued
Focal length : f=1.0
Relative aperature : F:1.3
Angle of field : 2ω=21°

| | | | |
|---|---|---|---|
| R5 = 1.26821 | $\overline{d4}$=0.01579 | | |
| R6 =−0.816 | $\overline{d5}$=0.20316 | Nd3=1.74400 | νd3=44.9 |
| R7 = 0.681756 | $\overline{d6}$=0.01158 | | |
| R8 = 1.59490 | $\overline{d7}$=0.42 | Nd4=1.69680 | νd4=55.6 |
| R9 =−1.50805 | $\overline{d8}$=0.06632 | | |
| R10= 2.57565. | $\overline{d9}$=0.06316 | Nd5=1.68893 | νd5=31.1 |

4. A projection lens system comprising a positive meniscus lens G1 (as numbered consecutively from front to rear) convex to the front, a biconcave lens G2, a biconvex lens G3, a positive meniscus lens G4 convex to the front, and a biconcave lens G5, said lens system being designed in accordance with the following data, wherein R1, R2, . . . R10 represent the radii of curvature of the surfaces of the lenses, $\overline{d1}, \overline{d2}, \ldots \overline{d9}$ represent the axial air separations or thicknesses of the lenses, Nd1, Nd2, . . . Nd5 represent the refractive indices for the helium d-line and νd1, νd2, . . . νd5 represent the Abbe's dispersion numbers;

Focal length : f=1.0
Relative aperature : F:1.3
Angle of field : 2ω=21°

| | | | |
|---|---|---|---|
| R1 = 0.904846 | $\overline{d1}$=0.157 | Nd1=1.74400 | νd1=44.9 |
| R2 = 7.32215 | $\overline{d2}$=0.21447 | | |
| R3 = 0.905002 | $\overline{d3}$=0.4794 | Nd2=1.76182 | νd2=26.5 |
| R4 = 0.978981 | $\overline{d4}$=0.0157 | | |
| R5 = 1.22224 | $\overline{d5}$=0.203 | Nd3=1.74400 | νd3=44.9 |
| R6 =−0.817508 | $\overline{d6}$=0.0117 | | |
| R7 = 0.682305 | $\overline{d7}$=0.3945 | Nd4=1.69680 | νd4=55.6 |
| R8 = 1.56265 | $\overline{d8}$=0.0782 | | |
| R9 =−1.71871 | $\overline{d9}$=0.0636 | Nd5=1.74077 | νd5=27.7 |
| R10= 2.33964. | | | |

5. A projection lens system comprising a positive meniscus lens G1 (as numbered consecutively from front to rear) convex to the front, a biconcave lens G2, a biconvex lens G3, a positive meniscus lens G4 convex to the front, and a biconcave lens G5, said lens system being designed in accordance with the following data, wherein R1, R2, . . . R10 represent the radii of curvature of the surfaces of the lenses, $\overline{d1}, \overline{d2}, \ldots \overline{d9}$ represent the axial air separations or thicknesses of the lenses, Nd1, Nd2, . . . Nd5 represent the refractive indices for the helium d-line and νd1, νd2, . . . νd5 represent the Abbe's dispersion numbers;

Focal length : f=1.10
Relative aperature : F:1.3
Angle of field : 2ω=21°

| | | | |
|---|---|---|---|
| R1 = 0.967539 | $\overline{d1}$=0.157 | Nd1=1.74400 | νd1=44.9 |
| R2 = 14.9841 | $\overline{d2}$=0.21886 | | |
| R3 =−0.917019 | $\overline{d3}$=0.52149 | Nd2=1.76182 | νd2=26.5 |
| R4 = 1.00392 | $\overline{d4}$=0.0157 | | |
| R5 = 1.26136 | $\overline{d5}$=0.203 | Nd3=1.74400 | νd3=44.9 |
| R6 =−0.842659 | $\overline{d6}$=0.01174 | | |
| R7 = 0.697871 | $\overline{d7}$=0.4432 | Nd4=1.69680 | νd4=55.6 |
| R8 = 1.38587 | $\overline{d8}$=0.1 | | |
| R9 =−1.77176 | $\overline{d9}$=0.0636 | Nd5=1.74077 | νd5=27.7 |
| R10= 2.39221. | | | |

* * * * *